United States Patent [19]

Clark

[11] 3,938,494
[45] Feb. 17, 1976

[54] COOKING APPARATUS
[75] Inventor: Morton L. Clark, Bradenton, Fla.
[73] Assignee: Guaranteed Weather, Inc., Bradenton, Fla.
[22] Filed: June 12, 1974
[21] Appl. No.: 478,695

Related U.S. Application Data
[63] Continuation of Ser. No. 265,296, June 22, 1972, abandoned.

[52] U.S. Cl. .................. 126/41 R; 99/339; 99/446; 126/25 R
[51] Int. Cl.[2] .......................................... A47J 37/06
[58] Field of Search ............ 126/25, 40, 41; 99/339, 99/442, 446

[56] References Cited
UNITED STATES PATENTS

| | | | |
|---|---|---|---|
| 2,817,331 | 12/1957 | Kaplan et al. | 126/41 R |
| 2,879,761 | 3/1959 | Foster et al. | 126/40 |
| 3,208,808 | 9/1965 | Knapp | 99/339 X |
| 3,298,361 | 1/1967 | Clark | 126/25 R |
| 3,319,562 | 5/1967 | Turcott et al. | 99/446 X |
| 3,520,290 | 7/1970 | Winters | 126/25 R |
| 3,638,635 | 2/1972 | Drennan | 126/41 R |
| 3,692,012 | 9/1972 | Wiggins | 126/25 R |
| 3,693,534 | 9/1972 | Martin | 126/25 R X |

Primary Examiner—William F. O'Dea
Assistant Examiner—Harold Joyce
Attorney, Agent, or Firm—Barnes, Kisselle, Raisch & Choate

[57] ABSTRACT

Cooking apparatus adapted for multi-purpose use as a grill, oven, stove or patio heater, and comprising a chamber formed by a lower housing section having upright walls and by a hinged cover for opening and closing the top of the chamber. The bottom of the chamber is open to admit a low velocity, large volume flow of fresh air into the chamber. A single gas burner extends lengthwise of the chamber adjacent the open bottom and can be regulated for cooking to produce a low, yellow-tipped blue flame which creates a narrow zone of incandescence in a much wider layer of incombustible bodies supported on a grate spaced above the burner. The cooking zone is spaced above the grate and contains one or more grills extending generally coextensive with the layer of incombustible material so that at least the major portion of the cooking area is horizontally offset out of vertical alignment with the zone of incandescence. The enclosure has a perimeter outlet smaller than the air inlet and located between the upper edges of the lower section walls and the overhanging side walls of the cover. The large volume air flow vertically upwardly through the vertically spaced zones is induced solely by convection currents generated by the burner and incombustible bodies, the latter serving as means for dispersing the heat, baffling the upward air flow and emitting radiant heat. Additional features include an exterior drip tray adapted to control admission of air to the chamber, an anti-flare grease diverter, a burner and grate subassembly which is readily removable and usable by itself as a fireplace heater, a cook-top cover and associated auxiliary cover.

42 Claims, 14 Drawing Figures

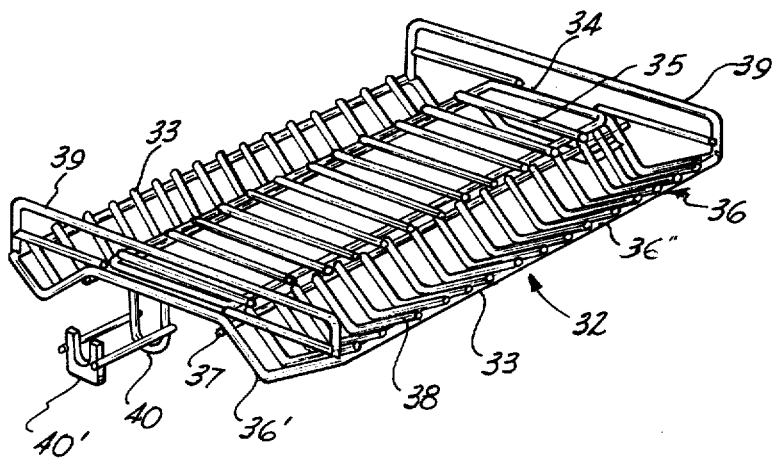
Fig-8
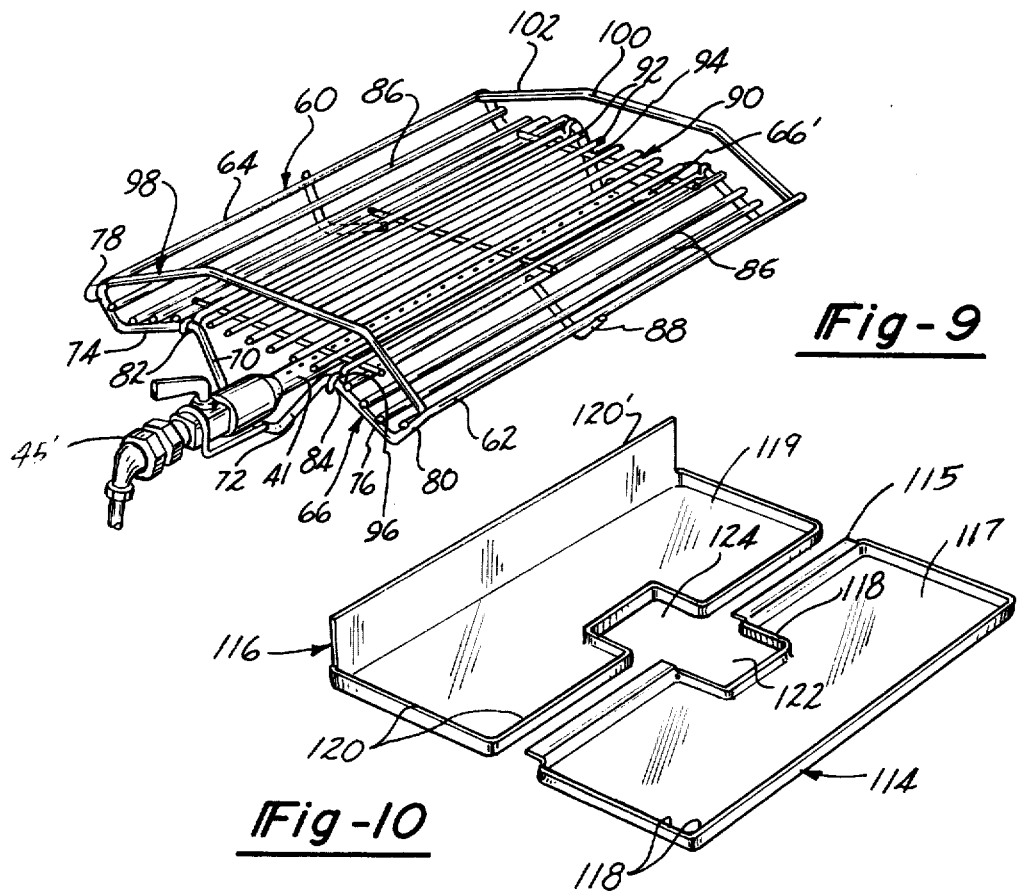
Fig-9
Fig-10

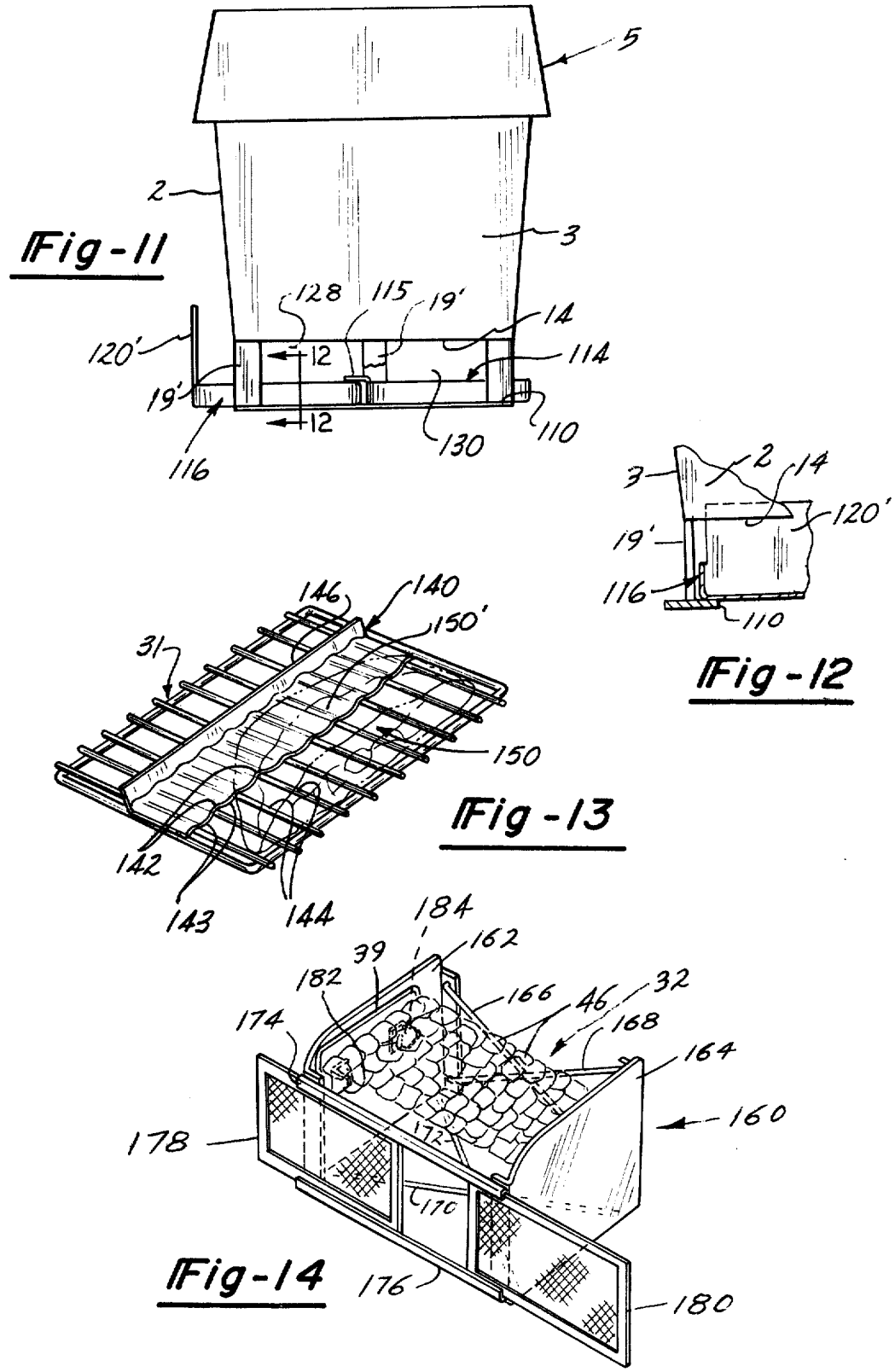

COOKING APPARATUS

This is a continuation of application Ser. No. 265,296, filed June 22, 1972, abandoned.

This invention relates to a cooking apparatus adapted for both indoor and outdoor cooking which can be simultaneously or alternatively used as a grill, a baking oven, a cooking stove, and an infra red patio or space heater. The apparatus is preferably heated or fired by gas.

Gas fired grills such as are commonly used outdoors have many problems in common such as burner burn-outs, grease fire flare-ups, and cremated meat or foods. This is even more true in current outdoor gas grills wherein the gas burner and grate are enclosed in a housing having bottom, side and end walls and a hinged cover for almost completely closing off the top of the housing with only enough air outlet to meet carbon monoxide and other gaseous emission requirements of the American Gas Association (A.G.A.). In such gas grills the bottom of the housing is usually closed with the exception of narrow slots provided under the burners for admitting only enough air to support combustion. The burner is usually disposed close to the bottom so that there is very little air supply or circulation below the burner and also the grate covered with lava rock is set close to the burner so that the whole set-up in effect acts as a heat treating pot which subjects the burner to severe heating punishment and burn-outs.

Further, these prior art grills do not admit sufficient air into the grill housing to consume the grease so that the grease melts and has to be drained away or the grease, due to incomplete combustion, causes excessive smoke and flame flare-ups and cremation of food.

Further in the prior art grills the cover mates with the housing to substantially close the grill so that there is a minimum of exhaust venting. Hence, when the cover is closed, smoking ensues, grease flare-ups or fires are common, the meat is frequently cremated and the burner, grate and grill life is shortened. Accordingly, such prior art grills cannot usually be operated with the lid down because of the resultant grease flare-ups and fires and the cremation of the meat. Various manufacturers have suggested in the case of flare-ups to pour water on the fire to douse the flames and warn that the food must be carefully watched every three or four minutes while cooking to avoid cremated food. These manufacturers of prior art grills also usually advise against cooking with the top down or closed and advise frequent inspection of the food being cooked on the order of every four or five minutes in order to avoid destruction of the food by flare-ups and cremation.

It is an object of this invention to provide an improved grill or cooking apparatus which obviates or alleviates all the above mentioned problems and difficulties.

Another object of this invention is to provide a gas fired grill which even when heavily fatted meat, such as pork spareribs, is being broiled or grilled, and even with the top or cover of the grill housing down or closed, substantially no smoke will be produced, almost no grease flare-ups will occur and the meat will be grilled or cooked without fear of cremation and without need for watching the grill constantly during the cooking period.

A further object of the invention is to provide a grill apparatus which can be simultaneously used to grill food, such as meat, to bake or roast foods, such as pies, biscuits, and meats, and to cook on top of the housing such, for example, as boiling beans or other vegetables, frying ham, bacon, sausage, other meats and eggs, or at a lower temperature as a warming oven or to heat rolls, buns, etc.

Another object of this invention is to provide a grill having a gas burner with a greatly increased life and which is substantially free of burner burn-outs and smoke and grease flare-ups, and which avoids cremation of meat and other foods during the grilling or while cooking, and that is substantially free of blowing out in the wind.

It is a further obejct of the invention to provide a grilling apparatus wherein the gas burner unit is provided with an ample air supply below the burner which keeps the burner relatively cool and avoids any heat treating pot effect underneath the burner and thus prolongs the life of the burner.

This invention also contemplates a grill or cooking apparatus having a multiple level cooking capacity wherein the heat produced by the gas flame is substantially uniformly distributed within the grill housing and throughout its four corners, while maintaining a slightly higher temperature in the upper part of the grill housing so that grilling can be done on the upper grill with equal speed as the lower grill, if desired.

It is a further object of this invention to provide a gas fired grill wherein fat or other meat can be grilled or cooked with a minimum of shrinkage so that the meat even when well done is tender and juicy.

A further object of the invention is to provide a gas fired grill wherein the grate with its cover of incombustible material, such as lava rock, the burner and the valve controlling the flow of gas to the burner can be easily removed as a unit. This permits the unit to be used in an outdoor grill in the summertime, for example, and then removed in the wintertime to an indoor fireplace where it can be used for a romantic fire, for heating the room or for cooking purposes.

It is a further object to provide a grill housing which by use of a drop front permits observation and repositioning of object being cooked without the necessity of opening the top of the housing with its attendant loss of heat, and which enables food to be cooked or warmed on the top without disturbing such food.

It is a further object of the invention to provide a gas fired grill in which, due to an improved air flow feature of the invention, cooking can be done at a substantially lower temperature than is considered normal for a given kind of food and yet still much more rapidly and uniformly, and in which the juices can be volitalized and put back in the meat, thereby providing not only less shrinkage, but more tender and juicy meat.

It is a further object of the invention to provide a gas fired grill wherein the meat can be placed close to the fire with the top of the grill housing either closed or open without excessive smoking and with greatly reduced risk of fire flare-ups.

A further object of the invention is to provide a grill wherein the exterior of the walls (front, rear and end walls) of the housing are substantially below the temperature within the housing so that these walls can be painted with a paint that will stand up under such lowered temperatures.

Other objects, features and advantages of the present invention will become apparent from the following detailed description taken in conjunction with the accompanying drawings wherein:

FIG. 8 is a perspective view of one embodiment of the grate.

FIG. 9 is a perspective view of the removable heating unit consisting of the gas burner, gas valve, a second embodiment of the grate, and with the lava rock omitted for clarity.

FIG. 10 is a perspective view of a multi-section drip tray and wind diverter adapted for installation below the grill apparatus.

FIG. 11 is a side elevational view of a modified grill apparatus similar to that of FIGS. 1–7, except for its leg construction which is adapted to slidably support the drip tray of FIG. 10 disposed below the open floor of the grill in grease catching position.

FIG. 12 is a fragmentary vertical sectional view taken on line 12—12 of FIG. 11.

FIG. 13 is a perspective view of an anti-flare-up grease diverter shown resting on one of the grills of my grill apparatus.

FIG. 14 is a perspective view of a supporting enclosure for removably receiving the removable heating unit of FIG. 9 in a fireplace.

Figure 1:
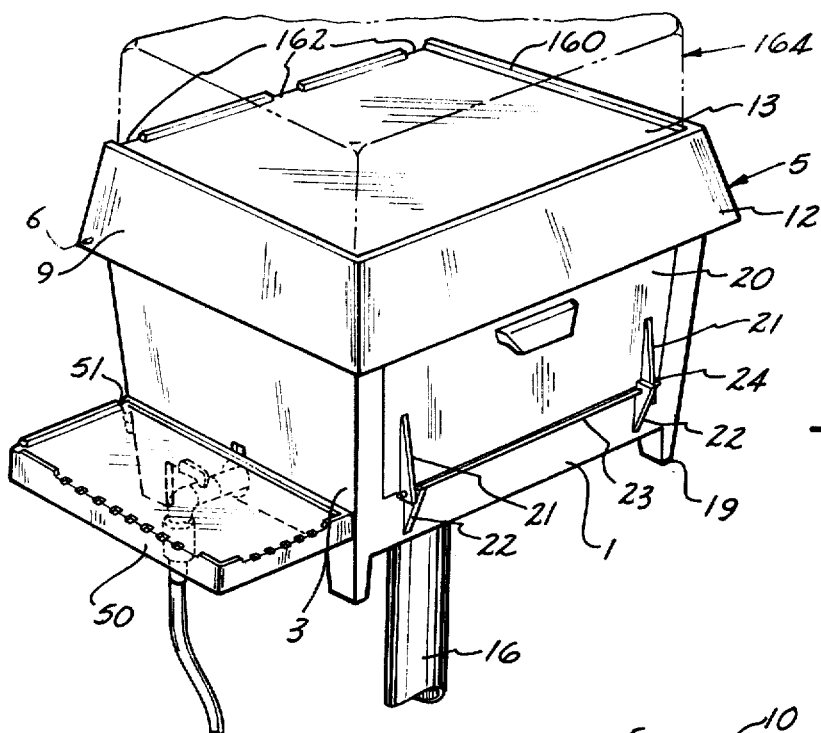
FIG. 1 is a perspective showing one embodiment of a grill apparatus constructed in accordance with my invention shown with the cover down and in closed position and the front door pivoted up to closed position.

Referring more particularly to the drawings my grill apparatus comprises a housing or lower section having a front wall 1, rear wall 2, side walls 3 and 4 and a cover 5. Cover 5 is hinged along its lower rear edge to the housing by rod 6 carried on perforated hinge ears 7 projecting rearwardly of the rear wall 2, the outer end of the rod 6 extending through opening 8 in the side walls 9 and 10 of the cover 5. The hinge openings 8 are positioned, e.g., about an inch forward of the rear wall 11 of the cover 5. Cover 5 also has a front wall and a flat top 13.

The housing or lower section of my grill apparatus, 1–4, and the cover 5 are preferably made of cast aluminum but can be made of any other suitable metal such as cast iron or steel.

Figure 5:
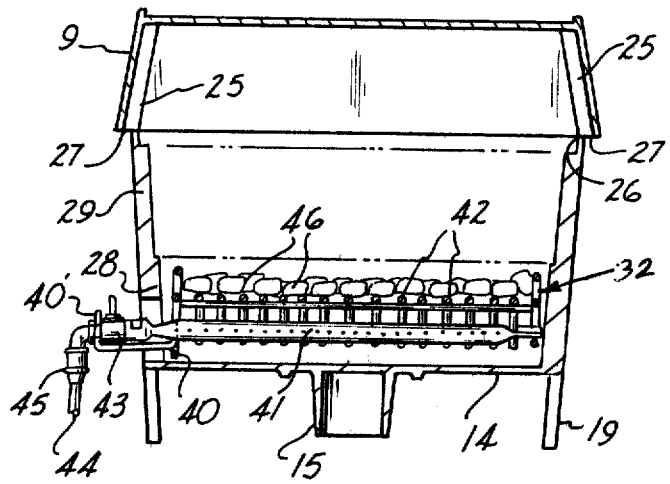
FIG. 5 is a vertical section along the line 5—5 of FIG. 3.
Figure 6:
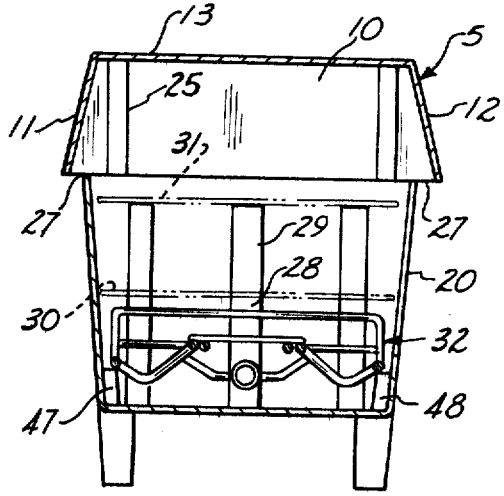
FIG. 6 is a vertical section along the line 6—6 of FIG. 4.
Figure 7:
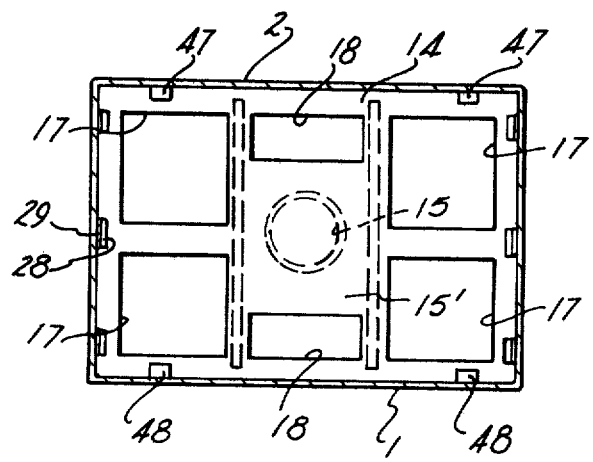
FIG. 7 is a horizontal section looking down on the bottom of my grill apparatus along the line 7—7 of FIG. 4.

It has been customary in the prior art to permit only a minimum amount of air intake, i.e., just enough to support combustion, via a small inlet opening in the bottom of the housing, and to provide only a minimum area outlet near the top of the housing, i.e., again just enough to pass A.G.A. requirements on carbon monoxide and other gaseous content in the products of combustion. By contrast, in accordance with a principal feature of my invention, the grill apparatus is provided with relatively more inlet area at the bottom of the housing and relatively more air outlet area near or at the top of the housing than hitherto considered necessary or desirable in the prior art. Thus, as best seen in FIG. 7, the bottom of the housing is relatively more open, preferably being perforate over the major portion of the bottom area of the housing and with enough material left to make a structurally sound grid or floor 14 which can be provided with a socket 15. Socket 15 is preferably integrally cast with and dependent from a flat center section 15' of floor 14 of the housing. One method of installation when the grill apparatus is used outdoors is to mount it on a post 16 supported in the ground (FIG. 1), the upper end of which is telescoped into socket 15. Another method of support is to mount the grill apparatus on a table top, portable cart or other flat supporting surface. For this purpose the housing in the embodiment of FIGS. 1–7 is provided with four corner legs 19. When it is desired to mount the grill apparatus either indoors or outdoors on a table or other flat supporting surface, the legs support floor 14 of the housing an inch or more (preferably 2 inches) above such surface to provide an ample supply of air through the substantially open floor 14 to the inside of the housing.

Figure 2:
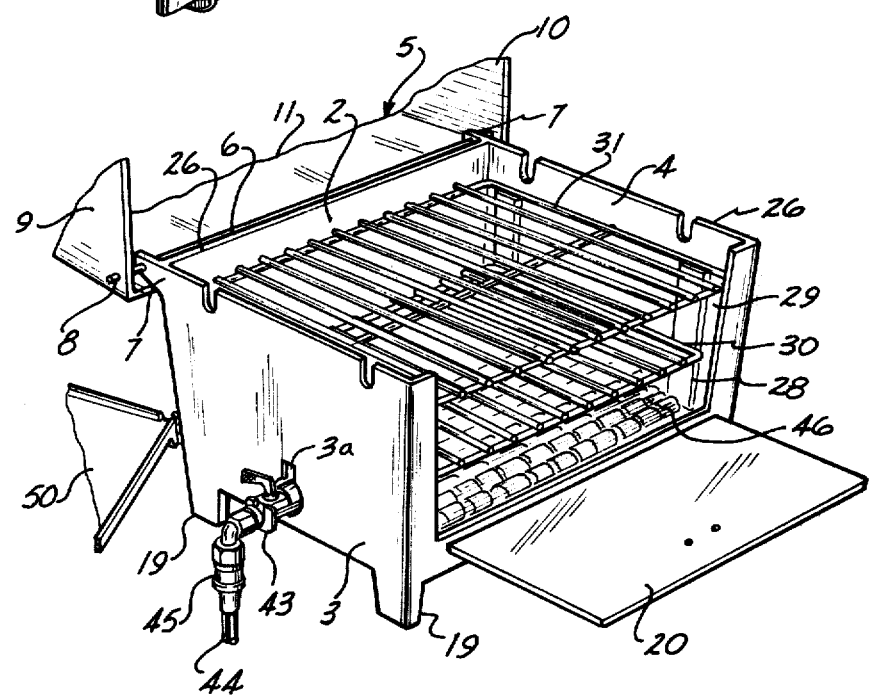
FIG. 2 is a perspective of my grill apparatus of FIG. 1 showing the inside of the apparatus with the cover up and the front door down.
Figure 3:
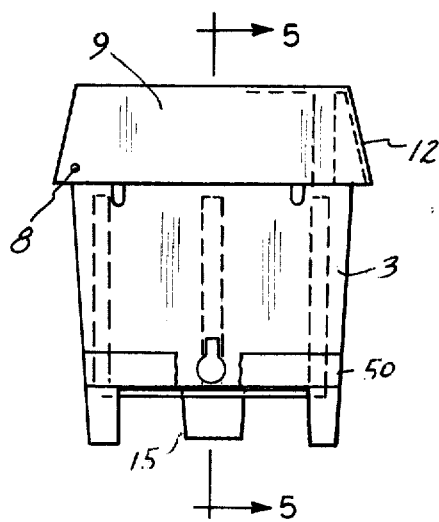
FIG. 3 is an end view of the left hand side (as viewed in FIG. 1) of my grill apparatus.
Figure 4:
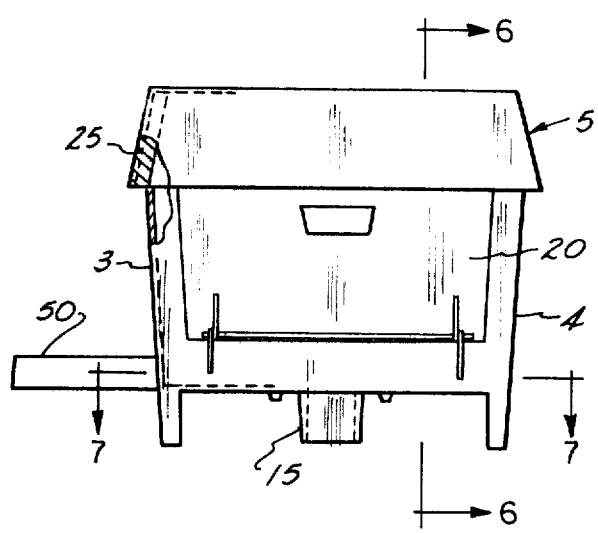
FIG. 4 is a front elevation of my gas fired grill apparatus.

The front wall of the housing is provided with a hinged door 20 which can be lowered to horizontal position (FIG. 2) to provide a shelf and access to interior without raising the cover. The door is provided with a pair of perforated hinge knuckles 21 and the front wall 1 of the housing is provided with a pair of spaced triangular hinge knuckles 22 which cooperate with a rod 23 and hinge knuckles 21 to hinge the door 20 along its lower edge to wall 1. The upper flat horizontal surfaces 24 of the lower hinge knuckles 22 serve as stops or rests for holding the door 20 in horizontal operating position (FIG. 2).

The cover 5 is provided with a boss 25 (FIGS. 3, 4, and 5) adjacent the forward ends of each of the side walls 9 and 10 which bosses overlap and rest on the top edges 26 of the associated side walls of the housing to support the lid along its forward edge when the lid or cover 5 is down, the lid 5 being supported along its rear wall by the hinge structure 6, 7, 8. The front wall 12 of the cover 5 overhangs and thus is spaced outwardly of the upper edge of door 20 a sufficient distance such that the cover does not have to be opened to permit lowering of the front door.

With cover 5 in its lowered position it will be noted that the side walls 9–11 (skirt) of the cover 5 clear the top edge 26 of the housing or lower section around its entire circumference. This clearance or gap 27 which exists when the cover is down forms the outlet for gases exiting the grill apparatus and consists of the lateral or horizontal spacing defined between the top edge of the rear wall 2, side walls 3 and 4 and the front wall 1 of the lower section of the housing, which define the inner boundary of the outlet, and the rear wall 11, side walls 9 and 10 and front wall 12 of the cover 5, which define the outer boundary. The area of this peripheral outlet may be varied but preferably is about half the total area of the air inlet openings controlling entrance of air into the housing, i.e., openings 17 and 18 in floor 14 in the embodiment of FIGS. 1–7, to obtain the best performance. In one operational grill of a given size and constructed pursuant to the drawings herein, it has been found that best performance is obtained with approximately a total of about 45 square inches of air inlet area in floor 14 or in the side inlet defined by the floor and drip tray embodiment of FIGS. 10–12 (under the bottom of the cooking area) and a total of about 22½ square inches of outlet area around the top. However, improved performance, without any of the drawbacks of the prior art, is also obtained ranging downwardly to about 15 square inches of air inlet area and 12 square inches of outlet area. These values of inlet and outlet area are predicated on a successful experimental unit which measures 13 inches wide by 19 inches long at the bottom; 15 inches wide by 20 inches long at the top; and 10½ inches high from floor 14 to edge 26. The same ratios are preferably maintained in different sizes, although these dimensions represent about the most popular size for an outdoor grill. Increasing the outlet area relative to inlet area decreases the speed of the cooking, and with relatively more outlet than inlet area, meat cooked in the grill becomes more dried out and does not retain its juices nearly as well. However, the resulting increase in convection air flow through the grill does eliminate flare-ups and burner burnouts and maintains a relatively cool wall so that the outside finish does not deteriorate. While I prefer the inlet and outlet area ratio as previously described, with air flow coming in from below via the perforate floor 14, and gases exiting via the perimeter outlet, the high volume, low velocity burner-induced convection air flow effect can be produced by other inlet and outlet arrangements such as wall ports and cover ports, provided the relatively greater inflow area is below the burner or grate, and relatively greater air outflow area is above the grill or grills, but generally such side wall and/or top surface porting is not as effective in terms of overall performance and/or efficiency of operation and/or construction.

This clearance or gap 27 between the walls of the cover and the entire top edge of the lower section provides only a slightly restricted outlet through which the hot gases generated by the gas flame during the cooking operation are exhausted to atmosphere. The lower edge of the cover 5 can be approximately flush or even with the top circumferential edge 26 of the housing but preferably the side walls of the cover drop below and overhang the top edge 26 of the housing such as e.g. one-half inch or less. This provides a baffle which deflects the wind and protects the grill against the weather when outdoors. However, the important thing is that the outlet gap 27, along with the open bottom 14 of the lower section of my grill, assures a relatively large fresh air supply to, and air flow through, the housing of the grill at all times and a relatively unrestricted flow outwardly of the heated air along with the products of combustion through gap 27 to atmosphere. The venting of the cooking space about part or all of the perimeter of the housing is also believed to enhance uniformity of cooking even under widely varying cooking loads. It is this convection air flow principle which is believed to play an important role in overcoming and obviating the defects of the prior art grills enumerated above.

The side walls 3 and 4 of the housing are each provided with a lower set of bosses 28 (FIGS. 2 and 6) projecting inwardly from the side walls and an upper set of bosses 29 also projecting inwardly of the side walls. These bosses support conventional steel wire grills 30 and 31. Both grills 30 and 31 may be used at the same time or either alone for grilling foods, such as e.g., steak, ribs, hamburgers, etc. or the lower grill 30 may be used for purposes above described while the upper grill 31 is simultaneously used for baking pies, cakes, biscuits, etc.

The housing also has supported therein a grate 32 (FIG. 8) comprising gull wing side portions 33 of welded mild or ordinary carbon steel wire and a removable center section defined by rectangular frame 34 with cross bars 35 welded thereto. Center section 34 is made of stainless steel. The removable section 34 of the grate is positioned directly over the burner which is the area of highest temperature, e.g., in the area of 1600°F. Thus grate 32 complies with A.G.A. (American Gas Association) requirements, i.e., due to grate burnouts in the prior art, A.G.A. has required that any portion of a grate that is in the flame must be made of steel that will withstand 1600°F. such as No. 304 stainless steel. However, due to the fact that the grill of the invention is preferably operated with a "healing flame," i.e., a yellow tipped blue flame low in oxygen content, grate burnout is not a problem even with an all carbon steel grate. Nevertheless, in order to conform to A.G.A. requirements and at the same time create a large saving in manufacturing costs, the stainless steel center section 34 is provided where required and is detachable mounted by snap-on connectors to the main frame work of the grate, thereby avoiding the practically impossible task of welding stainless steel to mild steel. In accordance with another feature of my invention, a narrow band of flame is generated, preferably centrally of the housing, which in turn reduces the size of the stainless steel section, with attendant decreased cost as compared to prior art units with open flame spread substantially all over the bottom or in a wider area than contemplated by the present invention.

Grate 32 also comprises an outer generally rectangular frame 36 with two intermediate longitudinal stringer wires 37 welded at their ends to the transverse end portions 36' of frame 36. A series of short V-shaped formed wires 38 are welded at their outer ends to the longitudinal member 36'' of frame 36 and at their inner ends to the associated stringer 37. The grate is also provided with handle portions 39 which keep the lava rock coals on the grate even when being transported. A U-shaped yoke 40 having a lateral extension support bracket 40' is welded to and dependent from the raised center portion of transverse member 36' to provide a cradle support for the valve end of a gas burner 41. The blind end of the burner is similarly supported by a drop center strut 40'' at the opposite end of the grate (FIG. 5). Burner 41 is in itself conventional, consisting of a uniformly round throughout its length metal tube having a row of equispaced holes 42 extending along each side of the burner. By way of example, the burner can be made of a round steel tube 1½ inches in diameter having 65 equispaced holes 42 on each side, half of the holes having a diameter of 1/32 inches and the other half being 1/64 inches in diameter, the holes of differing diameter alternating with one another over a length of 16 inches. If desired, a burner such as shown and described in the U.S. Pat. No. to Pierce 3,363,845, incorporated herein by reference, can be used.

The burner 41 is provided with a conventional hand-operated valve 43 which controls the flow of gas from any suitable gas source connected to the valve by tube 44 and a conventional quick disconnect 45. The gas can be supplied from a pressurized mobile tank of propane or from a municipal gas line in a city street. The quick disconnect is conventional and involves merely the turning of a ring through a few degrees or the pressing in of a lever to disconnect the pipe line 44 from the valve. Valve 43 is conventional and can be opened and closed fully or positioned at or turned to intermediate positions to control the rate of flow of gas.

In accordance with another feature of my invention, the grate 32 is completely covered by a bed of lava fragments or briquets 46 (FIGS. 2 and 5) or other non-combustible fragments which become incandescent when heated by the gas flame and thus produce radiant heat. The layer or bed can also be made from ceramic non-combustible briquets such as described in my prior U.S. Pat. No. 3,227,149.

Preferably the burner 41 is operated with a yellow tipped blue flame which is low in oxygen, commonly called a healing flame, because it produced considerably less burning-out or oxidizing of the grate than an all blue gas flame which is oxygen rich and consumes the grate at a higher rate than a yellow tipped flame. However, a blue flame can be used with my grill.

The spacing of burner 41, grate 32, grills 30 and 31 one above the other can be varied substantially. The important factor is that the burner should be spaced a sufficient distance above the floor 14 so as to insure a sufficient air flow about the burner and through the lower section and out through the outlet gap 27. To this end the burner should be located preferably about 1 inch above the floor, but experiments have shown that it will function properly even lower due to the relatively open bottom and free air flow.

The grate 32 is preferably positioned about 2 inches above the burner. Two support bosses 47 on rear wall 2 and two support bosses 48 on front wall 1 are located to support grate 32 at the desired elevation within the housing (FIGS. 6 and 7). The lower grill 30 is positioned about 2 inches above the grate and the upper grill 31 about 4 inches above the lower grill. The spacing of the burner, grate and lower and upper grills can be varied over wide limits but the above spacing has been found very satisfactory.

A cover 50, hinged as at 51 to the rear corner of walls 2 and 3 of the housing or lower section of my grill, is provided for the gas control unit 43. This cover can also serve as a shelf, FIG. 1, and is radially swingable outwardly, FIG. 2, to permit access to the gas control unit.

In accordance with still another feature of my invention, a reflector of infra red heat rays, such as reflector 46 shown in my above specified U.S. Pat. No. 3,227,149, which is incorporated herein by reference, can be placed in back of the grate and along the back wall 2 and side walls 3 and 4 of the lower section of my grill. Then with the gas burner on and the layer of briquets 46 heated to incandescence, the oven door 20 can be let down to shelf position, FIG. 2, preferably with the cover 5 in raised position the reflector will make an infra red patio heater out of my grill unit with an open fire to look at. With my unit it is also possible to cook and have a patio heater at the same time by leaving the door 20 open and cover 5 up since there is no spatter of grease to dirty the reflector. In the prior art, most if not all manufacturers, in an effort to distribute the heat, have had a burner in an H-shape, an X-shape, or some other shape providing open flame substantially over the entire length and breadth of the bottom of the cooking unit in an effort to distribute the heat evenly. However, such prior art arrangements have made it impossible to put meat on the grill without having the drippings from the meat fall into the open flame, thereby causing flare-ups and cremation of the meat. By using a single burner with a narrow flame and providing heat distribution by an increased and controlled air flow, I have made it possible to grill fat meat without flare-ups and meat cremation and through the use of the above combination, to actually cook such meats much more rapidly with a retention of juices, thereby producing a much better flavored and tender, juicy result.

Thus the use of a single gas burner 41 extending substantially throughout the length of my grill apparatus is an important feature of my invention because in operation when the gas is turned on the burner produces a flame about 2 inches wide and this flame in turn causes the lava rock to become incandescent throughout the length of the burner but only over a width of 4 inches to 6 inches. Hence, in the example given (15 inches wide at the top of housing 3), the zone of incandescence of the lava rock layer, which is created in the cooking mode of operation of the burner, has a dimension transverse to the longitudinal dimension of the burner approximately no more than one-third the corresponding dimension of the grill 31. However, the remainder of the lava rock is heated to a lower temperature which, although sufficiently high to produce a light smoking effect when grease drops on the lava rock, is low enough to reduce or eliminate flare-ups. Hence, barbecue flavoring is obtained without the flare-up and cremation problems of the prior art.

Air flows in relatively large quantity and at low velocity through the open bottom of my grill housing and then with the heated gaseous products of combustion flows upwardly and outwardly through the outlet gap 27. This fluid flow is believed to obviate the insulating effect of stagnant trapped air close to the surface of the food being cooked and this increases the heat transfer input to the food, and also contributes considerably to the substantially uniform temperatures that obtain throughout the interior of my grill when the cover 5 and the door 20 are closed as shown in FIG. 1. Despite the limited and relatively laterally concentrated area of the heat generating zone due to the location of the burner along the center or at one side of the grill, the baffling, radiant heating and dispersing effect of the non-combustible layer of lava rock or the like when it becomes incandescent is believed to also materially contribute to the uniformity of temperature obtained throughout the interior of my grill housing.

My grill even when operated under A.G.A. testing conditions with the cover 5 closed, and with 75 percent of the grill area covered with food and the burner turned to its highest flame condition, produced no substantial amount of carbon monoxide and the carbon monoxide produced was substantially less than that allowed by the A.G.A. Laboratories.

Referring to FIG. 9, a modified grate and burner subassembly 60 is illustrated which is supported in the grill housing in the same manner as grate 32 described previously. Grate 60 has a generally rectangular outer frame rod with longitudinal portions 62 and 64 joined to transverse end members 66 and 68. Members 66 and 68 have a gull wing configuration as viewed in end elevation, with a drop center portion 66' flanked by upwardly and outwardly inclined portions 70 and 72 which in turn are respectively connected to downwardly and outwardly sloping portions 74 and 76 which extend downwardly to an elevation spaced about an inch above portions 66'. Portions 74 and 76 integrally connect to end portions 78 and 80 respectively which again extend upwardly and outwardly to a junction with the lengthwise stringers 64 and 62 respectively. The peaks 82 and 84 formed by the junction of portions 70–74 and 72–76 are disposed at an elevation above side stringers 62 and 64. A series of evenly spaced intermediate longitudinal stringers 86 are supported at their ends by and welded to portions 74 and 78 and 76 and 80, the stringers 86 are braced at midpoint by V-shaped supports 88 welded thereto. Grate 60 has, like grate 32, a removable stainless steel center section 90 disposed in a horizontal plane above burner 41. Section 90 is made up of a series of uniformly laterally spaced longitudinally extending stringers 92 interconnected by three or more transverse braces 94 disposed at each of the ends and in the middle of stringers 92. The transverse braces 94 are long enough to extend over and rest on the innermost stringer 86 on each side section of the grate. The ends of two outermost stringers 92 which are disposed to overlie the peaks 82 and 84 of the end members 66 are bent downwardly to form snap-on hooks 96. These hooks are dimensioned to have a slight interference sliding fit with peaks 82 and 84 so that as grate section 90 is pushed downwardly the hooks deflect slightly to provide the snap-on connection of section 90.

The ends of the grate are also provided with handle portions 98 which have a center section 100 extending horizontally about an inch above the elevation of section 90 and terminating in downwardly inclined portions 102 which extend generally parallel to portions 74 and 76.

Grate 60 is thus adapted to retain a bed of lava rock or other incandescent material such as ceramic lumps which preferably is distributed evenly in a single layer over the upwardly arched perforate surface provided by the stringers 92 of the center section and the side stringers 86. The gull wing configuration of grate 60 also retains the outer edges of the bed of lava rock in place so that the entire burner and grate subassembly, including a load of lava rock thereon, can be readily removed from the grill housing and carried to a fireplace support and vice versa. The upwardly arched surface enables a single layer of lava rock to simulate a deep bed of coals in an economical and efficient manner in accordance with my prior U.S. Pat. No. 3,227,149 while at the same time supporting those rocks or coals located directly above burner 41 spaced therefrom by a distance of preferably two inches. Also, burner 41 is conveniently supported on the middle section of the drop center portion of the end member 66 so that no additional supporting structure is required for the burner.

As in the case of grate 32, grate 60, along with burner 41 and its associated valve control, is readily removable as a unit from the lower section of the housing by disconnecting the quick disconnect 45, then tilting the closed end of the burner upwardly while moving it endwise to draw the valve through a key-hole shaped side port 3a in housing wall 3. The grate and burner subassembly then can be placed directly in a home fireplace for winter use to provide a gas-fired fireplace burner. The ready removability of the grate and burner subassembly also facilitates cleaning of the same as well as the interior of the housing.

Referring to FIGS. 10–12, the legs 19' of the housing may be modified to provide three legs on each side as illustrated in FIGS. 11 and 12, with the three legs on each side joined at their lower ends to a common horizontal flange 110 which projects horizontally inwardly a short distance beneath the floor 14 of the housing and is spaced therebelow about two inches. The two flanges 110 provide support surfaces on which a pair of drip trays 114 and 116 (FIG. 10) may be slidably supported along their ends. Tray 114 is inserted from the front side 1 of the housing and tray 116 from the rear until their inner longitudinal edges abut centrally of the grill. Trays 114 and 116 have upturned edges 118 and 120 respectively about ½ inch in height extending around the entire perimeter of each tray to form a liquid tight wall to contain the grease drippings on the flat horizontal bottom surfaces 117 and 119 of each tray. Trays 114 and 116 are suitably notched in their inner edges at 122 and 124 to accomodate and closely encircle the center post 15 of the housing. Tray 114 has a horizontal flange 115 extending from its inner edge 118, interrupted by notch 122, which projects over the inner edge 120 of tray 116 (FIG. 11) in the abutted condition of the trays to prevent leakage of grease drippings where the trays abut.

Preferably, the rear edge 120' of tray 116 is made higher than the other upright edges 120 of the section, say about 3 to 4 inches, so that it can vertically overlap the bottom edge of the rear wall 2 of the housing to substantially block or baffle the space between such edge and the bottom of tray 116 when the tray is fully inserted into position beneath the housing (FIG. 11). If desired, tray 116 may be shortened so that baffle 120' actually touches wall 2 when fully inserted. Edge 120' then serves as a wind baffle or shut-off when the grill housing is oriented with its rear wall 2 facing into and oriented perpendicular to the direction of the wind. The large lower side openings 128 and 130 defined horizontally between the legs 19' of the housing and vertically between floor 14 and trays 114 and 116, as well as the single opening of the same height which extends the full length across the front of the housing below the front wall 1, provide air intake openings which may have, if desired, a total area less than or in excess of the air inlet openings 17 and 18 in floor 14. Hence the provision of the removable trays 114 and 116 need not interfere with or restrict the large volume, low velocity air flow principle of my grill construction, the air inlet control being performed in this event solely or primarily by openings 17 and 18. With this arrangement all of the grease drippings are caught on the trays at an elevation well below the floor 14 of the housing which, of course, is even further below the burner elevation and, hence, in a zone which is substantially at outside ambient temperature. Accordingly, there is no danger of grease flaring or burning as it collects on the trays. The trays are very easily removable for dumping of the grease and cleaning. The trays also can be used as collectors for natural juices in the event it is desired to make gravy, au jus or for basting.

If desired, the upright edges 118 and 120 of trays 114 and 116 can be varied in height so that side openings 128 and 130 and/or the associated front opening, rather than floor openings 17 and 18, serve as the primary or sole controlling entrance orifice to regulate the amount of air that is admitted to the inlet openings in the floor 14 of the housing. Adjustment of the air inlet openings 128 and 130 is accomplished more readily and economically in this manner than by varying the aperture pattern of floor 14 of the housing. Thus, merely by providing a selection of trays with different side flange heights or by providing sliding or pivoted side flanges on the trays, the grilling unit can be modulated to suit various types of cooking and heating end uses as desired by the user without the need for varying the construction of the housing itself.

Referring to FIG. 13, another auxiliary feature of the present invention is the provision of an anti-splatter grease diverter or grilling tray 140 which may be provided as an accessory to the grill of my invention to further augment its anti-flare-up characteristics and increase the usable grilling area. Tray 140 comprises a corrugated strip of sheet metal adapted to extend the full length of the top grill 31 or the bottom grill 30 and to rest loosely on or snap onto the grill. The width of tray 140 is preferably coextensive with the front to rear dimension of the high heat flame zone of the subjacent burner 41. In the example given herein, this fore and aft dimension may be on the order of 4 inches. Tray 140 may be made flat, but preferably is a corrugated strip so as to have a series of peaks 142 and valleys 143 alternating in spaced relation longitudinally of the strip. If desired, the peaks 142 may be spaced to coincide with the front to rearwardly extending rods 144 of grill 31. One longitudinal edge of tray 140 is bent upwardly to form an upstanding flange 146 which may extend upwardly one-half to one inch above the level of the peaks 142.

In use, tray 140 provides a shield or a baffle which is adapted to underlie large pieces of meat such as the pork rib shank 150 indicated in phantom in FIG. 12, particularly when the non-ribbed flank portion 150' of the shank has not been trimmed off and it is desired to cook the same with the ribs. During operation of the grill any grease which melts from the portion of the cut of meat overlying tray 140 will drip downwardly onto the tray and then drain via the troughs provided by the valleys 143 to and over the right-hand edge of tray 140 as viewed in FIG. 13. The grease dripping from this edge will fall downwardly onto and/or through the layer of lava rock 46 beyond the incandescent radiant heating zone thereof and, if it drips further on down through the grate, it will miss the burner 41 and travel on downwardly to the grease tray 114. Should the burner position be oriented differently than in the example shown herein, for example, being located farther toward the front or back of the grill housing, tray 140 can likewise be shifted to remain oriented vertically above the burner to prevent grease from dripping thereon. Tray 140 has been found to be very effective in further reducing the incidence of flare-up when grilling very greasy cuts of meat, such as pork ribs, which have in the past been extremely difficult to grill successfully in gas grills without constant supervision and watering of the lava rock.

A further feature of the present invention is best seen in FIG. 1 and comprises the provision of a special configuration on the top of the cover 5 to provide a flat cooking surface 13. The upper edges of the convergently inclined side walls 9, 10, 11 and 12 of cover 5 extend a slight distance, say ¼ or ½ inch, above the elevation of surface 13 to provide a marginal lip or bead 160 extending around all four sides of surface 13. Bead 160 may, if desired, be interrupted along the back edge of the cover by a plurality of say three weep slots 162. Cover 5 is then designed so that when it is in closed position surface 13 is oriented at a slight downward incline toward the rear of the housing so that rain water or water from melting snow will run off through the weep slots. Bead 160 also serves to retain a rectangular five-sided auxiliary cover 164 (shown in phantom in FIG. 1) securely in place on top of cover 5. Enough heat is transferred through the sheet metal or cast aluminum material of cover 5 when the grill is in operation to heat the space enclosed by cover 164 and surface 13 so that the same is effective to serve as a warming oven for buns or cooked food waiting to be served. Preferably cover 164 is made of stainless steel or other corrosion resistant metallic material and is provided with suitable handles (not shown).

It has also been found with the aforementioned experimental grill unit using a burner 41 with only about a 10,000 BTU maximum rated output that even without the auxiliary cover 164 in place enough heat is transmitted through the top wall of cover 5 to the cooking surface 13 to enable frying of raw sausage, bacon and eggs, as well as boiling vegetables, etc. Hence construction of cover 5 with the flat top cooking surface adds a large amount of cooking area to the unit at no extra cost. Such dual exterior frying and interior backing or barbecuing usage is practical because door 20 can be lowered to tend the other food being cooked within the housing without requiring that the cover be raised, which would otherwise disturb the cooking being done on the flat top. In addition, the uniform heating obtained in the dome enclosed by cover 5, due in good measure to the large volume convection air flow being vented around most of or all of the perimeter of the cover via outlet 27, ensures that surface 13 will be heated relatively uniformly throughout its extent so that uneven cooking does not occur on surface 13.

From the foregoing description, it will now be apparent that the cooking apparatus of the present invention amply fulfills the aforestated objects while providing an economical, easy to operate and maintain unit capable of performing a multiplicity of functions in a highly efficient manner. In addition, greatly improved results are obtained from the standpoint of reducing or preventing grease fires and flare-ups and food cremation while retaining a juicy character to meats, fish and fowl barbecued or roasted in the unit.

It is to be noted that four vertically spaced zones of substantially equal lateral extent are provided within an enclosed space, i.e., (1) a combustion zone extending from floor 14 vertically to slightly above burner 41; (2) a radiant heat distribution and smoke generating zone occupied by grate 32 or 60 and lava rock 46 or equivalent material supported thereon; (3) a superimposed cooking zone occupied by the grills 30 and 31; and (4) a venting zone (and auxiliary cooking zone in the case of large food items such as whole turkeys) defined primarily by the interior volume of cover 5 over the cooking zone. Also there is a relatively large subjacent air inlet area 17–18 extending laterally generally coextensively with the laterial dimensions of the aforementioned four vertically stacked zones and a cooperative perimeter outlet 27 correlated in area to the inlet area generally intermediate in elevation the third and fourth zones. It is believed that this structure enables a single narrow source of heat to generate a large volume, low velocity fresh air flow solely by convection updraft through all zones which appears to promote more uniform cooking with cover 5 closed and also insures complete combustion for minimum generation of carbon monoxide gases. The confinement of the flame or heat generating zone to a narrow band fore and aft of the unit maximizes the area of the grill which can be used for barbecuing of meat directly on grill 30 and/or 31;

i.e., only a narrow zone directly vertically aligned with burner 41 need be left vacant of meat in order to avoid substantially all chance of flare-up. However, even this narrow central zone of the grill can be utilized for meat barbecuing by adding the anti-flare or diverter tray 140, as explained previously.

The large inflow of fresh air percolating through the layer of lava rocks 46 is effective at medium to low burner settings to maintain this material at a temperature which is sufficient to generate a light amount of smoke for imparting the traditional barbecuing flavor to the meat being grilled while at the same time keeping the lava rocks cool enough to avoid undesirable ignition of grease drippings on the rocks. The temperatures obtained in the third zone have a relatively high degree of uniformity laterally thereof, and the temperature gradient increases vertically through the third and fourth zones. These characteristics are believed to constitute and unexpected and surprising result in the gas fired barbecue grill art inasmuch as the art has generally taught that the flame should be well spread out over the floor and that the housing should be kept as closed as possible to smother food or grease combustion, allowing only enough air into the housing to supply secondary air to support combustion of the gas fuel being fed to the burner. However, despite a large flow of air through the grill of the invention, the same is relatively free of grease flare-ups even when left unattended for an extended period of time. The layer of lava rock, in addition to its smoke generating function, is also important during grilling to distribute the heat laterally from the narrow flame zone and to better heat the air percolating upwardly therethrough. The layer of lava rocks also serves as a baffle to spread out the rising column or columns of air and to separate the flame zone from the cooking zone.

It is within the scope of the present invention to vary the location of the burner 41, as for example placing it all of the way to the rear of the unit or all the way to the front of the unit, or even in an antechamber offset to the front or rear of the housing, and in such event to utilize a burner adapted to direct flames horizontally all in one direction into the housing and beneath the lava rocks. Even with this modification, the generally uniform heating is obtained in the third or cooking zone identified previously, and by thus offsetting the burner and incandescent zone of lava rocks can be shifted beyond the forward or rearward edges of the grills 30 and/or 31. The entire surface of the grill 30 and/or 31 can then be utilized for grilling or barbecuing of meat since grease dripplings therefrom cannot strike the incandescent zone of lava rock or the burner in its offset zone. However, the central location of the burner as illustrated herein is preferred because it is the most efficient location, either when cooking or when using the cooking apparatus as an infrared patio heater. During such heater usage the gas valve is turned all the way up to produce maximum heating, which broadens the zone of incandescence in the lava rock and produces a dancing flame fire through the lava rock having an attractive asthetic appearance.

It is also to be understood that when barbecuing, roasting, or grilling with cover 5 closed, burner 41 is normally turned down to say half open by suitably adjusting valve 43, and likewise the primary air adjuster on the burner is closed down to provide the aforementioned yellow "healing flame." Calrod or other type electrical heating elements, or other equivalent non-solid fuel heat sources, may be substituted for burner 41, being located in much the same manner. With either type of heat source, herein referred to as a burner, in conjunction with the lava rocks 46, barbecuing can be achieved much more efficiently and neatly, and with no loss in flavor, than can be accomplished with the use of a conventional coal or charcoal fired grill. If desired, hickory chips or other wood shavings can be sprinkled on the lava rocks to impart wood burning flavoring to the food being cooked.

The quick disconnect coupling 45 or 45' may be optional but its use augments the ease of conversion of grate unit 32 or 60 from its role as a heat source in the grill apparatus to a gas fireplace grate. As illustrated in FIG. 14, another desirable auxiliary piece of equipment comprises a fireplace grate support 160 which can be inexpensively provided to removably receive unit 32 or 60 in the fireplace hearth. Support 160 has a pair of upright sidewalls 162 and 164 braced at the rear by cross wires 166 and 168, at the bottom by cross wires 170 and 172 and at the front by a pair of horizontal rails 174 and 176 which serve as tracks to slidably receive door panels 178 and 180. Suitable brackets or struck-out-tangs 182 and 184 are provided on walls 162 and 164 respectively upon which the end members 36' or 66' of grates 32 or 60 are adapted to rest. The rear brackets are preferably positioned higher than the front brackets such that the grate is inclined when resting thereon and hence is oriented to present an upwardly and rearwardly arched surface configuration. The upper edges of sidewalls 162 and 164 preferably extend slightly above handles 39 or 98 to hide the side edges of the grate from view, thereby enabling a single layer of lava rock to simulate a deep bed of coals whether or not the burner is ignited. Preferably, when the removable grate-burner-lava rock unit 32 or 60 is in use in the grilling apparatus, an artificial layer of simulated lava rock (not shown) made from styrofoam or other suitable inexpensive plastic material, is placed on brackets 182 and 184 to improve the appearance of the grate support and enclosure 160 during such periods of non-use.

It is to be further understood that experiments have shown that only a portion of the outlet 27 need be employed, such as along the front or rear of the housing, without seriously disturbing the uniformity of the heating obtained in the cooking zone. Likewise, the side openings 128 and 130 or front opening may be blocked off and yet relatively uniform air distribution appears to be obtained within the housing. Due to the cool temperatures obtained beneath burner 41, a gas supply line (not shown) can be run from center portion 15' (for connection to a supply line in post 16) along floor 14 and down through an opening 17 to the exterior coupling 45 or 45', which is another desirable feature because it retains easy access to control valve 43 and the adjacent primary air port shutter of burner 41 while enabling the grilling apparatus to be used with a post 16 having a concealed supply line and swivel coupling therein, and thus to be easily turned to adjust to the prevailing wind conditions.

Hitherto, commercially available gas grills to common use and having an average overall size such as described elsewhere herein, have cooking areas ranging from 235 square inches to approximately 300 square inches. Even when two such units are combined as in the case of one recently advertised as the largest gas grill ever built (two complete units joined together)

only 535 total square inches of cooking area have been provided. Due to unique construction and utilization of the flat top 13 for true cooking, the provision of drop door 20 for easy access to a large interior cooking area without lifting the lid 5, my air flow system which provides adequate heat throughout with a very low gas input, and a very inexpensive burner 41, a gas grill constructed pursuant to my invention provides 820 square inches of cooking area at a much lower manufacturing and operating cost than anything known to me in the prior art while still utilizing a single average size housing. Accordingly, the invention achieves the further object of providing a much large capacity grill that can be effectively operated at a fraction of the gas input and manufactured at a greatly lowered cost as compared to any prior art grill of comparable capacity known to me.

I claim:

1. A cooking device comprising in combination an enclosure having upright walls defining a chamber having a top and a bottom, burner means in said chamber above said bottom, a perforate grate above said burner means, a layer of perforate incombustible material disposed on said grate adapted to be heated by said burner means to incandescence in at least a narrow portion thereof directly over said burner means, a cover for closing the top of said chamber, means for supporting food to be cooked above said grate and adapted to allow heated air to rise past the food, gaseous fluid outlet means extending along said upright walls of said enclosure spaced below the uppermost portion of said cover and above said food support means whereby said device is vented to atmosphere through said outlet means, and air inlet means in the vicinity of said bottom of said enclosure having an area greater than that of said outlet means and correlated therewith and said burner means such that atmospheric air is inducted from the outside atmosphere via said air inlet means solely by convection currents generated by operation of said burner means and is heated as it flows freely upwardly sequentially past said burner means and said layer of material, the heated air thence flowing upwardly past said food support means and outwardly via said outlet means to atmosphere, said inlet-outlet-burner correlation being such that said inducted air flows at low velocity but in sufficiently high volume to cause a constant circulation of heated air around the food cooking on said food support means whereby any stagnant cold layer of air adjacent the food is stripped away by said flowing air to thereby effect more efficient radiant and convection heating of the food.

2. The cooking device set forth in claim 1 wherein said enclosure has a lower section open at the top thereof containing said burner means, grate, incombustible material and at least a portion of said food support means, and wherein said cover is openable and has a sidewall extending in the closed position of said cover in spaced relation with the top edge of the lower section to provide an open gap between the sidewall of the cover and the top edge of the lower section throughout at least the major extent of the perimeter of the open top of said lower section.

3. The cooking device set forth in claim 2 including means for hinging said cover to the lower section and cooperating stop means on said cover and lower section for holding the cover in lowered position.

4. The cooking device set forth in claim 3 wherein the cover is made of metal and has a flat imperforate top with the sidewall depending downwardly from said top.

5. The cooking device set forth in claim 4 wherein the depending sidewall of the cover in lowered position extends in spaced relation below and outwardly of the upper edge of the lower section.

6. The cooking device set forth in claim 5 wherein said incombustible material comprises a bed of noncombustible bodies on said grate which are made incandescent by heat generated by said burner means to provide a source of radiant heat, and said food support means comprises a grill adapted to receive the food to be cooked above said grate.

7. The cooking device set forth in claim 6 wherein said burner means comprises a single gas burner in the form of a tube with gas outlets, said burner extending across said lower section below said grate such that the gas flames generated by said burner in the grill cooking mode thereof causes the noncombustible bed to have a zone of incandescence over the flame much narrower than said grill and the circulation of air and gaseous products of combustion upwardly through the lower section creates a generally uniform temperature laterally of the lower section at least in the vicinity of said grill when said cover is closed.

8. The cooking device set forth in claim 7 including a second grill spaced above said first-mentioned grill in the upper area of said lower section, said first grill serving as a support for food being grilled and said second grill serving as a support for food being grilled, roasted or baked.

9. The cooking device set forth in claim 1 wherein the flat imperforate top of the cover is heated and serves as an exterior cooking surface.

10. The cooking device set forth in claim 9 wherein said device has an auxiliary cover open at the bottom resting at its lower edge of said cover to enclose a space above said flat top and to define therewith an auxiliary food warming or baking chamber.

11. The cooking device set forth in claim 1 wherein said burner means is supported by the grate and provided with a disconnectable connection with its source of gas whereby said burner means, grate, and the bed of noncombustible bodies can be removed as a unit from the lower section when the cover is raised.

12. The cooking device set forth in claim 1 wherein said air inlet means has approximately at least fifteen square inches of area and wherein said outlet means has approximately at least twelve square inches of area, said bottom has an area of approximately two hundres forty-seven square inches, said enclosure tapers upwardly and outwardly from said bottom to said outlet means and has a lateral area in the vicinity of said outlet means of approximately 300 square inches, and said outlet means is spaced approximately 10 inches above said bottom.

13. The cooking device as set forth in claim 12 wherein said air inlet means is approximately forty square inches in area and said outlet means is approximately twenty square inches in area.

14. The cooking device as set forth in claim 1 wherein said bottom comprises a perforated wall with the perforations in said wall defining said air inlet means.

15. The cooking device as set forth in claim 1 wherein the area in square inches of said air inlet means is at least about 1/267 of the cubic inch volumetric content of said chamber and the area in square inches of said outlet means is at least about 1/333 of the cubic inch volumetric content of said chamber.

16. The cooking device as set forth in claim 15 wherein said volumetric content of said chamber is approximately four thousand cubic inches.

17. The cooking device as set forth in claim 1 wherein said enclosure has a lower section with a door opening therein and a door in said upright wall thereof for closing said door opening, said door being movable between a closed position closing said door opening in said upright wall and an open position exposing via the door opening said incombustible material and said food support means.

18. The cooking device as set forth in claim 17 wherein said cover is openable and has a side wall extending in the closed position of said cover outwardly above the upper edge of said door in the closed position thereof to form a weather shielding overhang for said door, the lower edge of said cover sidewall in the portion thereof extending adjacent said door being spaced from the upper edge of said door in the closed position thereof a distance just sufficient to clear the path of travel of said upper edge of said door when the door is moved between its open and closed position whereby said door can be opened and closed without opening said cover.

19. The cooking device as set forth in claim 18 wherein said cover has flat top adapted to serve as a cooking or warming surface and has a marginal bead extending about the perimeter thereof.

20. The cooking device as set forth in claim 19 wherein said bead has drain openings therein along one portion thereof to serve as run-off openings for rain water collecting on said top surface.

21. The cooking device as set forth in claim 20 including an auxiliary cover open at the bottom thereof and having a lower edge shaped to rest on said flat top and to nest closely within said bead.

22. The cooking device as set forth in claim 14 wherein said enclosure has a plurality of legs extending therefrom below said bottom adapted to support said cooking device on a supporting surface with said bottom spaced thereabove.

23. The cooking device as set forth in claim 1 wherein said bottom has openings therein defining at least in part said air inlet means, and said device includes means forming a flat surface spaced below and extending parallel to said bottom, and wherein said device includes supports adapted to define with said flat surface a series of vertical air inlet openings leading to the space below said bottom to feed outside air to said bottom openings.

24. The cooking device as set forth in claim 23 wherein the area of said vertical air inlet openings is greater than the area of said bottom openings.

25. The cooking device as set forth in claim 23 wherein said means forming said flat surface comprises drip tray means supported on said supports and adapted to catch grease drippings falling downwardly from said food support means through said layer of incombustible material and through the openings in said bottom.

26. The cooking device as set forth in claim 25 wherein said bottom has a central portion with post connector means dependent therefrom adapted to connect to the upper end of an upright support post.

27. The cooking device as set forth in claim 26 wherein said drip tray means comprises a pair of trays removably received on said supports with one tray insertable from one side of said enclosure and the other tray insertable from the opposite side of said enclosure, said tray being shaped to encircle said post connector means and to abut one another to form a catch basin laterally generally coextensive with the openings in said bottom.

28. The cooking device as set forth in claim 27 wherein one of said trays has a horizontal flange along the inner edge thereof adapted to overhang the inner edge of the other one of said trays in the abutted condition thereof.

29. The cooking device as set forth in claim 25 wherein said tray means includes upright flange means extending adjacent one or more of said vertical air inlet openings defined vertically between said bottom and said tray means and horizontally between said legs, said flange means being dimensioned to regulate the communication of said chamber with atmosphere to thereby cause said vertical air inlet openings to function as the primary flow controlling orifice of said air inlet means.

30. The cooking device as set forth in claim 29 wherein said flange means includes an upright baffle extending along one edge of one of said trays and adapted to vertically overlap the associated one of said vertical air inlet openings in the inserted position of said one tray to serve as a windshield for said associated vertical air inlet opening.

31. The cooking device as set forth in claim 1 wherein said grate comprises a framework constructed of metal rods oriented to from a supporting surface having a generally upwardly arched configuration from the front to the rear thereof, and wherein said burner means is disposed to extend below the uppermost portion of said arched supporting surface, said grate having means for supporting said burner such that said burner means and said grate can be removed from said enclosure as a unitary subassembly.

32. The cooking device as set forth in claim 1 wherein said grate comprises a framework made up of metal rods including an outer peripheral mild steel rod having two longitudinally extending portions defining the front and rear edges of said grate and a pair of gull wire side edge portions each having two downwardly slanting wing sections and a drop center portion therebetween, a series of mild steel rods supported at their ends on said wing sections of said peripheral rod and extending longitudinally of the grate parallel to one another, said grate also comprising a center section made up of a series of stainless steel rods, means for detachably connecting said center section to said grate, said burner being supported on said drop center portions vertically below said center section of said grate.

33. The cooking device as set forth in claim 32 wherein said grate has a pair of rods defining handle portions at each of the opposite longitudinal ends thereof, said handles being spaced above said side edge portions of said peripheral rod to retain said layer of incombustible material on said grate.

34. The cooking device as set forth in claim 7 wherein said food support means includes an anti-flare grease diverter adapted to be positioned above and in horizontal alignment with said burner means, said diverter being generally coextensive in length with the length of said burner means and having a dimension transverse to its length generally coextensive with the narrow zone of incandescence of said incombustible material created when said burner means is being operated in the food grilling mode thereof.

35. The cooking device as set forth in claim 34 wherein said diverter comprises a sheet metal member adapted to extend horizontally above and rest on said food support means and having an upright flange extending along one longitudinal edge thereof to serve as a dam for grease collecting on said diverter whereby the grease runs off said diverter along the other longitudinal edge thereof opposite said flange.

36. The cooking device as set forth in claim 35 wherein said diverter comprises a sheet metal member having corrugations therein defining peaks and valleys extending transversely of said member.

37. The cooking device as set forth in claim 36 wherein said grill is made up of evenly spaced metal rods extending transversely to the longitudinal dimension of said burner, and said diverter corrugations are dimensioned to coincide with the spacing of said grill rods whereby each peak of said diverter member is adapted to rest on an associated one of said grill rods.

38. The cooking device as set forth in claim 1 wherein said upright walls of said enclosure comprise front and rear walls and a pair of oppositely disposed side walls, and said bottom is joined to the lower edges of said walls to form a box-like enclosure open at the top thereof, said cover comprising a flat top and side walls depending therefrom, said cover side walls comprising a front wall, a rear wall and a pair of oppositely disposed side walls respectively associated with the front, rear and side walls of said lower section of said enclosure, said walls of said lower section tapering outwardly and upwardly, said side walls of said cover tapering outwardly and downwardly, said cover having support means adapted to rest on the upper edges of said lower section walls in the closed position of said cover, said side walls of said cover overhanging at their lower edges the upper edges of said lower section walls and being spaced outwardly therefrom to define a perimeter gap therebetween forming said outlet means.

39. The cooking device as set forth in claim 1 wherein said zone of incandescence of said layer created in the cooking mode of operation of said burner means has a dimension transverse to the longitudinal dimension of said burner means approximately no more than one-third the dimension of said food support means taken transversely of the longitudinal dimension of said burner means.

40. The cooking device as set forth in claim 1 wherein at least the major portion of the cooking surface of said food support means is horizontally offset out of alignment with said zone of incandescence of said layer of incombustible material.

41. The cooking device as set forth in claim 1 wherein said burner means is fueled by gas and has control means for regulating the amount of gas fuel and primary air admitted to said burner means and capable of adjustment to produce a yellow-tipped blue flame to generate a slightly reducing atmosphere in said chamber to thereby inhibit corrosion of said burner, food support means and grate.

42. A cooking device comprising in combination an enclosure defining a chamber having four vertically stacked zones therein comprising a heat generating first zone, a heat dispersing and radiating second zone disposed immediately above said zone and containing incombustible air permeable means comprising a layer of incombustible bodies extending in the aggregate laterally generally coextensive with said cooking zone, a cooking third zone disposed immediately above said second zone containing food support means and a heat collecting fourth zone spaced immediately above said third zone, air inlet means in said enclosure comprising a perforate wall extending laterally generally coextensive with said layer and below said heat generating zone communicating said heat generating zone with the outside atmosphere below said heat dispersing zone, means defining a gaseous fluid outlet in said enclosure at an elevation generally between said third and fourth zones, and heat generating means comprising a single element burner in said first zone occupying only a minor portion of the lateral extent thereof, at least the major portions of said second and third zones being offset horizontally out of vertical alignment with said burner, the area of said outlet means being less than that of said inlet means and being correlated with the heat output of said burner and the dimensions of said enclosure to allow a low velocity relatively large volume flow of air to flow upwardly sequentially through said zones, said air current being generated solely by convection currents induced by the heat given off by said burner and said heat dispersing and radiating means.

* * * * *